US012747112B2

(12) United States Patent
Zumberger et al.

(10) Patent No.: US 12,747,112 B2
(45) Date of Patent: Sep. 29, 2026

(54) LINER SYSTEM, AND UNLOAD STACKING ASSEMBLY AND METHOD THEREFOR

(71) Applicant: Stolle Machinery Company, LLC, Centennial, CO (US)

(72) Inventors: Neil Albert Zumberger, Sidney, OH (US); Bryan Lee Schoenlein, Minster, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 219 days.

(21) Appl. No.: 18/136,903

(22) Filed: Apr. 20, 2023

(65) Prior Publication Data

US 2024/0351798 A1 Oct. 24, 2024

(51) Int. Cl.

| | |
|---|---|
| ***B65G 47/14*** | (2006.01) |
| ***B65G 43/08*** | (2006.01) |
| ***B65G 47/34*** | (2006.01) |
| ***B65G 47/82*** | (2006.01) |
| ***B65G 57/04*** | (2006.01) |

(52) U.S. Cl.

CPC ......... *B65G 47/1407* (2013.01); *B65G 43/08* (2013.01); *B65G 47/34* (2013.01); *B65G 47/82* (2013.01); *B65G 57/04* (2013.01)

(58) Field of Classification Search

CPC .... B65G 47/1407; B65G 43/08; B65G 47/34; B65G 47/82; B65G 57/04; B65G 57/32

USPC ............ 414/788.1–795.3; 193/47; 198/419.2

See application file for complete search history.

(56) References Cited

U.S. PATENT DOCUMENTS

| | | | | |
|---|---|---|---|---|
| 1,124,145 | A | 1/1915 | Koepp | |
| 1,234,729 | A | 7/1917 | Champ | |
| 1,308,208 | A * | 7/1919 | Troyer | F26B 15/105 118/58 |
| 2,500,465 | A | 3/1950 | Meyer | |
| 3,036,693 | A | 5/1962 | Glocker | |
| 3,311,218 | A * | 3/1967 | Lederer | B65G 47/24 221/172 |
| 3,463,293 | A * | 8/1969 | Lederer | B65G 35/00 198/786 |
| 3,827,582 | A * | 8/1974 | Lederer | B65G 47/28 198/786 |
| 4,019,622 | A | 4/1977 | Messervey | |
| 4,124,112 | A | 11/1978 | Mohney et al. | |

(Continued)

FOREIGN PATENT DOCUMENTS

| | | | |
|---|---|---|---|
| DE | 4225147 | A1 | 9/1993 |
| GB | 1039064 | A | 8/1966 |
| GB | 2100234 | A | 12/1982 |

OTHER PUBLICATIONS

WO 2024/220123 Written Opinion (Year: 2024).*
WO 2024/220123 International Search Report (Year: 2024).*

*Primary Examiner* — Saul Rodriguez

(74) *Attorney, Agent, or Firm* — Eckert Seamans Cherin & Mellott, LLC

(57) ABSTRACT

An unload stacking assembly includes a discharge hopper for receiving container closures from a conveyance assembly. A deflector deflects the container closures into the discharge hopper in a desired orientation, and a control system detects the container closures and operates a pusher assembly to control movement of the container closers. The conveyance assembly is disposed in a horizontal plane and the discharge hopper is disposed at a discharge angle with respect to the horizontal plane.

9 Claims, 4 Drawing Sheets

(56) References Cited

U.S. PATENT DOCUMENTS

| | | | | |
|---|---|---|---|---|
| 4,391,560 | A * | 7/1983 | Fardin | B65G 47/248<br>198/462.1 |
| 4,691,501 | A | 9/1987 | King | |
| 4,840,138 | A | 6/1989 | Stirbis | |
| 5,119,676 | A | 6/1992 | Bower et al. | |
| 5,215,587 | A | 6/1993 | McConnellogue et al. | |
| 5,351,804 | A | 10/1994 | Haberstroh | |
| 5,476,362 | A | 12/1995 | Kobak et al. | |
| 5,564,877 | A | 10/1996 | Hamilton | |
| 5,680,960 | A | 10/1997 | Keyes et al. | |
| 5,947,337 | A | 9/1999 | Worth | |
| 6,343,496 | B1 | 2/2002 | Hanna et al. | |
| 6,547,057 | B1 | 4/2003 | Carson et al. | |
| 7,293,395 | B1 | 11/2007 | Galloway et al. | |
| 8,386,072 | B1 | 2/2013 | Mihalik et al. | |
| 8,826,850 | B2 | 9/2014 | Zumberger et al. | |
| 11,254,517 | B1 | 2/2022 | Zumberger et al. | |
| 11,337,373 | B1 * | 5/2022 | Kroskob | B66F 9/18 |
| 2003/0194308 | A1 * | 10/2003 | Carson | B65G 47/252<br>414/798.2 |
| 2004/0084280 | A1 * | 5/2004 | Ogle | B65B 35/38<br>198/405 |
| 2005/0011730 | A1 | 1/2005 | Wittman et al. | |
| 2010/0209604 | A1 | 8/2010 | Stammen | |
| 2010/0219043 | A1 * | 9/2010 | Baumann | B65G 47/82<br>198/598 |
| 2018/0057194 | A1 | 3/2018 | Burken et al. | |
| 2019/0271580 | A1 | 9/2019 | Sheridan | |
| 2022/0241802 | A1 | 8/2022 | Zumberger et al. | |

* cited by examiner

LINER SYSTEM, AND UNLOAD STACKING ASSEMBLY AND METHOD THEREFOR

FIELD OF THE INVENTION

The disclosed concept relates generally to machinery for container closures and, more particularly, to liner systems for container closures such as, for example, can ends. The disclosed concept also relates to unload stacking assemblies and methods for liner systems.

BACKGROUND OF THE INVENTION

It is known to apply sealant material, commonly referred to as compound, to the underside of container closures, for example, to facilitate subsequent sealing attachment (e.g., without limitation, seaming) of the closures to containers such as, for example, beer/beverage and food cans.

A liner machine, such as for example and without limitation, a rotary liner machine, is used to line (i.e., apply sealant or compound) to container closures, commonly referred to as can lids, shells, or can ends. Traditional liner machines (sometimes referred to simply as "liners") generally include a base having a processing assembly. In a rotary liner for example, the processing assembly may include a chuck assembly having a number of rotatable chucks, and a pivotal upper turret assembly disposed over the chuck assembly and including an electrical tank assembly, a rotary compound tank assembly, and a number of peripherally disposed fluid dispensing apparatus (e.g., sealant or compound guns) each being associated with a corresponding rotatable chuck of the chuck assembly. In operation, the can ends or shells coming into the liner are delivered into a downstacker in "stick" form (i.e., nested together in a vertical column or stack). The liner machine peels the bottom can end or shell from the bottom of the stack and deposits it into the aforementioned processing assembly where lining compound is subsequently applied.

Once completely lined, the can ends or shells are typically ejected linearly onto a flat belt conveyor, which then conveys the freshly lined shells directly into a hopper where the shells are stacked, or re-stacked, for transportation. Among other disadvantages, this manner of conveying and re-stacking freshly lined shells does not employ any time-gating devices to ensure the shells are re-stacked in an efficient manner, or that the compound has sufficiently cured within the shells prior to re-stacking. Consequently, traditional liner machines are unable to re-stack shells at high speeds (e.g., without limitation, 2100 ends per minute (EPM), or more) without damaging the shells and/or displacing compound within the shells. More specifically, there is no mechanism to prevent the shells from being re-stacked in a suboptimal configuration, for example, with shells undesirably overlapping, commonly referred to as "shingling," which can result in jamming. Furthermore, lining compound can be displaced from the shell, commonly referred to as compound spillover. Moreover, forces applied to the shells during the re-stacking process can result in physical damage to the shells. These issues have historically limited the operating speed of liner machines to about 2100 EPM, or less. Accordingly, production output, or throughput, has been limited.

There is, therefore, room for improvement in can liner systems and in re-stacker assemblies therefor.

SUMMARY OF THE INVENTION

These needs, and others, are met by embodiments of the disclosed concept, which are directed to an unload stacking assembly and method for a liner system. Among other advantages, the unload stacking assembly and method reduces forces applied to container closures, thereby overcoming known disadvantages of prior art liner systems and allowing the liner to operate at greater speeds and increased production volumes.

As one aspect of the disclosed concept, an unload stacking assembly comprises: a discharge hopper structured to receive a plurality of container closures from a conveyance assembly, a deflector structured to deflect the container closures into the discharge hopper in a desired orientation, a pusher assembly, and a control system adapted to detect the container closures and operate the pusher assembly to control movement of the container closers.

The control system may include at least one presence sensor for detecting the container closures and, responsive to detecting the container closures, adjusting the pusher assembly. The control system may include a first presence sensor for detecting the container closures upstream of the discharge hopper and a second presence sensor for detecting the location of the container closures with respect to the discharge hopper.

The conveyance assembly may be disposed in a horizontal plane, and the discharge hopper may be disposed at a discharge angle with respect to the horizontal plane. The unload discharge angle is preferably between 15-60 degrees and, more preferably, is about 35 degrees.

The deflector may be structured to induce a rotation motion of the container closures inside the discharge hopper. The discharge hopper may further comprise a vacuum structured to induce a force on the container closures to facilitate stacking of the container closures.

A liner system employing the aforementioned unload stacking assembly and an associated method are also disclosed.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
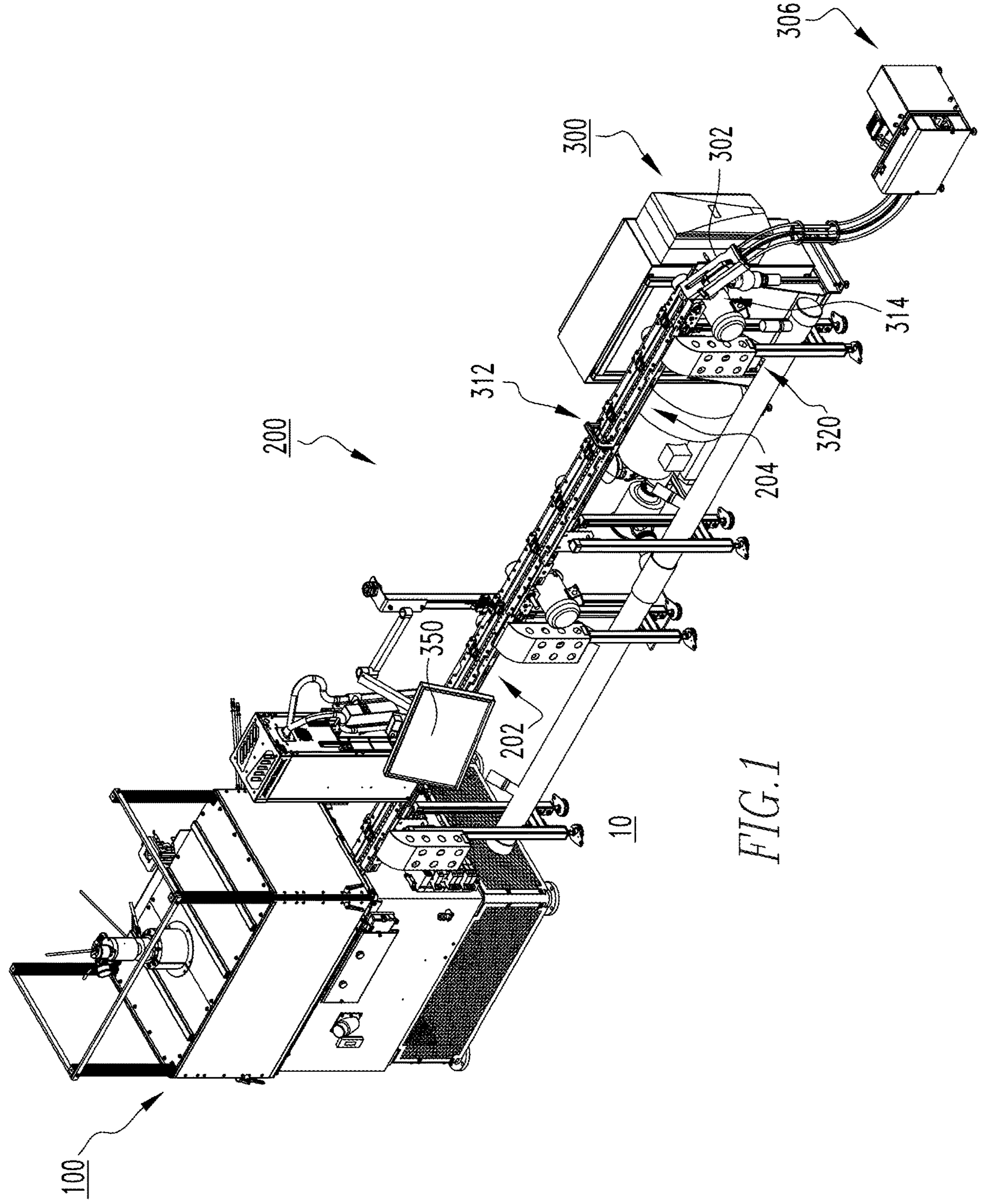
FIG. 1 is an isometric view of a liner system and unload stacking assembly therefor in accordance with a non-limiting embodiment of the disclosed concept.

It will be appreciated that although an unload stacking assembly in accordance with the disclosed concept is shown and described herein as used with respect to a rotary liner for applying a sealant or compound to container closures, e.g., without limitation can ends, it could alternatively be employed to convey container closures with a wide variety of other types of equipment and machines (not shown) in other applications.

Directional phrases used herein, such as, for example, up, down, clockwise, counterclockwise and derivatives thereof, relate to the orientation of the elements shown in the drawings and are not limiting upon the claims unless expressly recited therein.

The specific elements illustrated in the drawings and described herein are simply exemplary embodiments of the disclosed concept. Accordingly, specific dimensions, orientations and other physical characteristics related to the embodiments disclosed herein are not to be considered limiting on the scope of the disclosed concept.

As employed herein, the statement that two or more parts are "coupled" or "mounted" together shall mean that the parts are joined together either directly or joined through one or more intermediate parts.

As used herein, the term "operatively coupled" shall mean two or more components are functionally connected through one or more intermediate parts such that displacement, manipulation, or actuation of any of the coupled components causes a predefined response in the remaining components.

As used herein, the term "communicably coupled" shall mean that two or more electrical components are connected in such a way that power, information, or both may be exchanged between the coupled components.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "number" means one or a number greater than one (i.e., a plurality).

Figure 2:
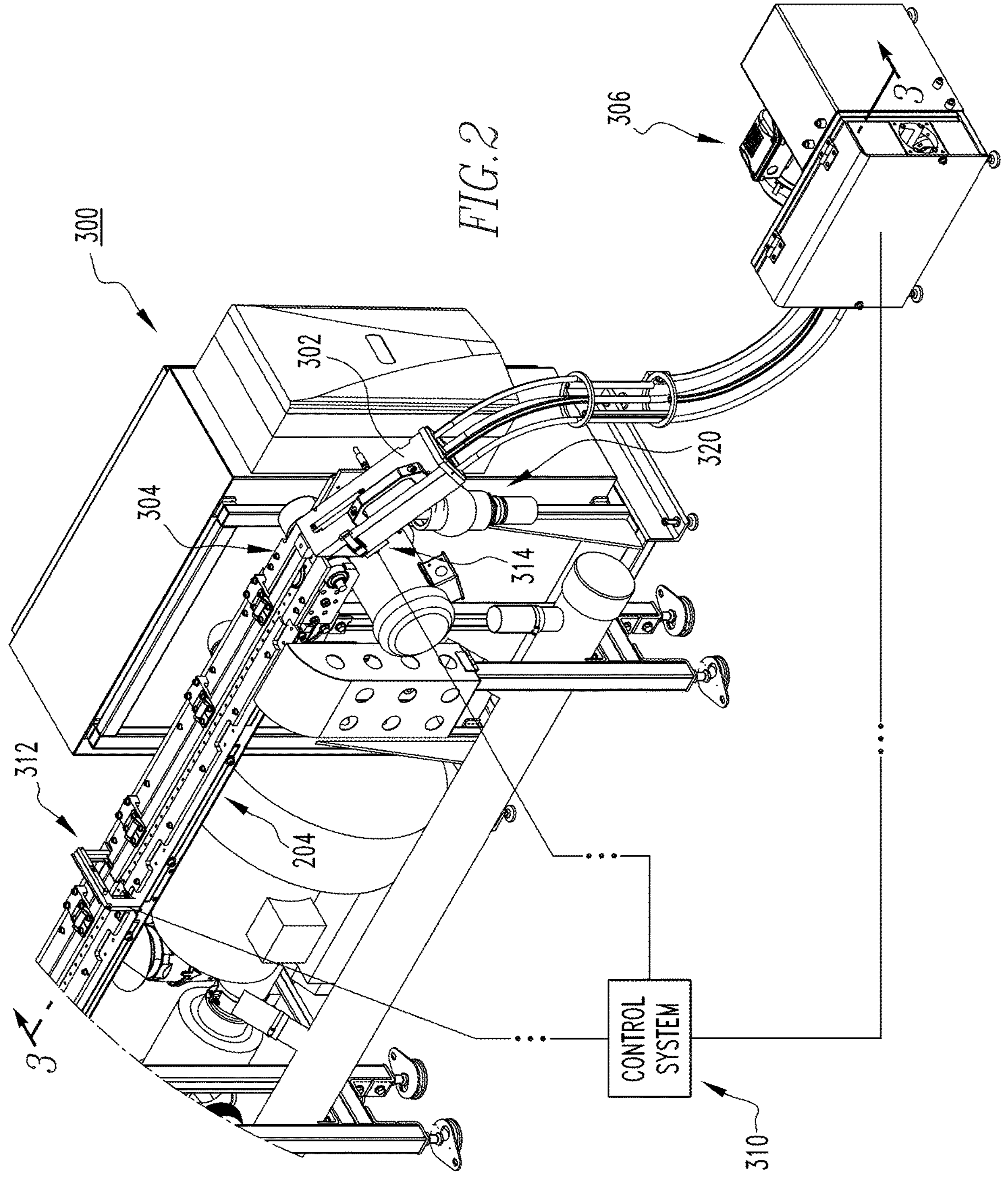
FIG. 2 is an isometric view of the unload stacking assembly of FIG. 1.
Figure 3:
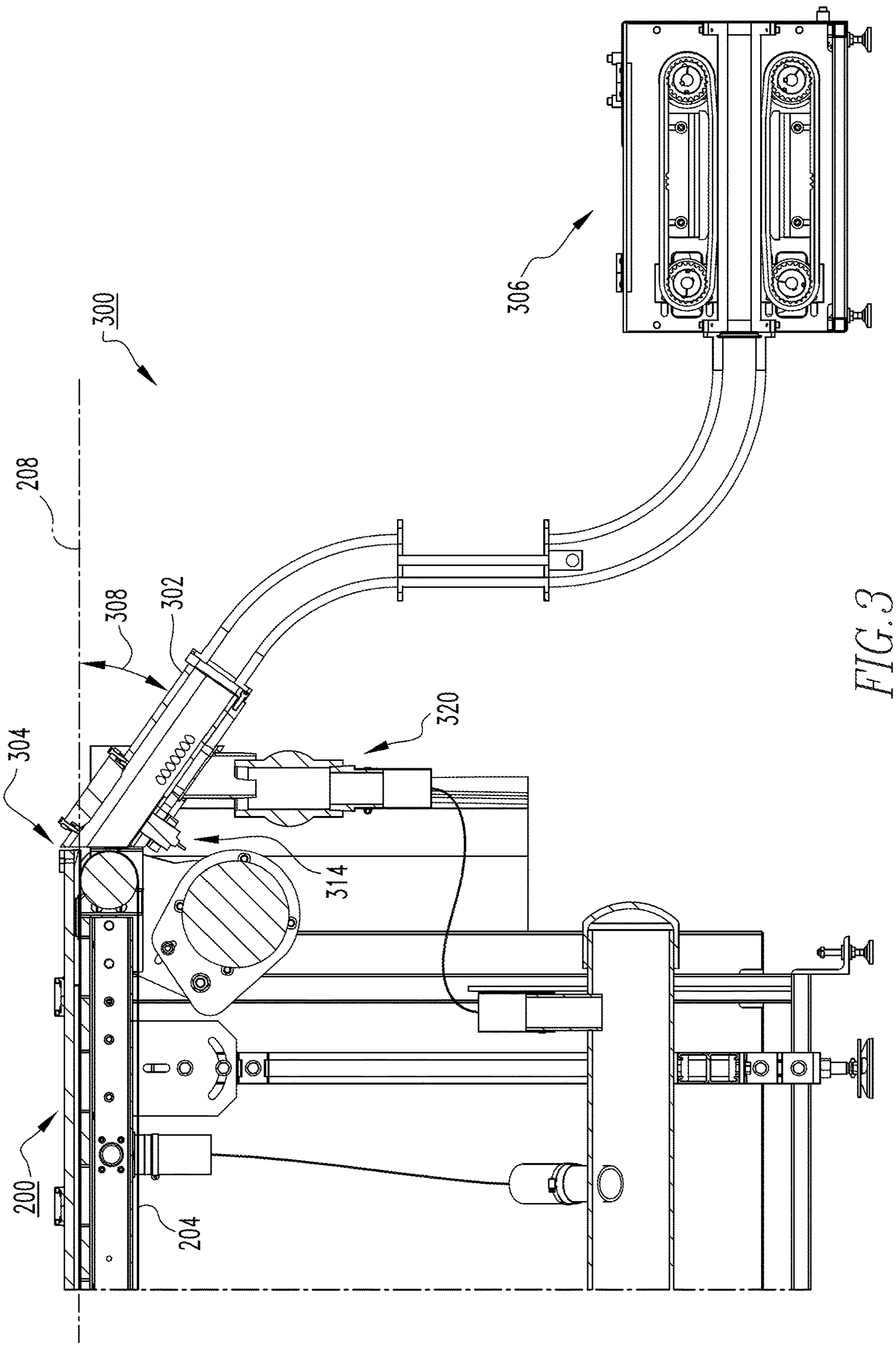
FIG. 3 is a section view of a portion of the unload stacking assembly taken along line 3-3 of FIG. 2.
Figure 4:
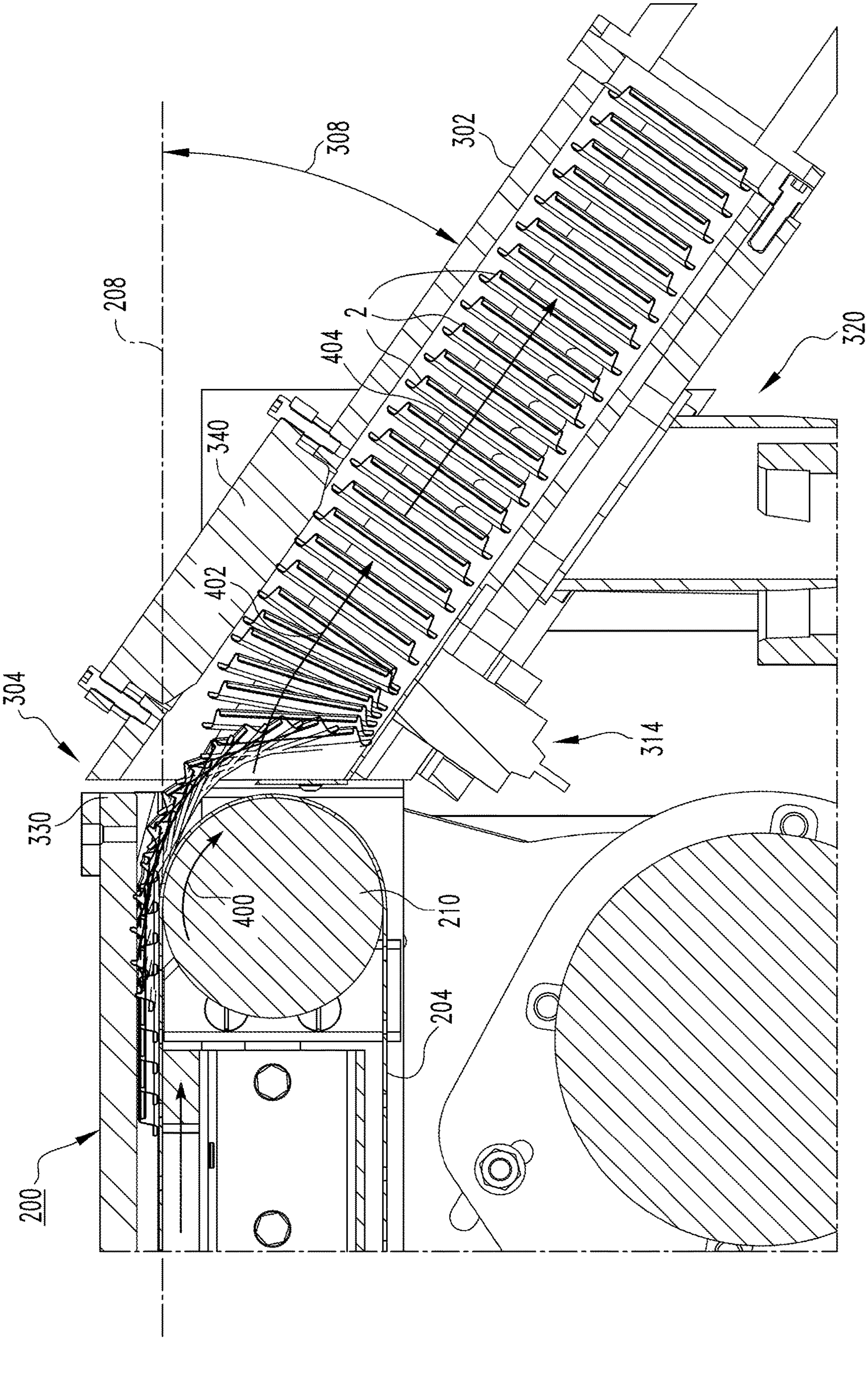
FIG. 4 is an enlarged view of a portion of FIG. 3 showing a plurality of stacked container closures in accordance with aspects of the disclosed concept.

Referring generally to FIGS. 1-4, the disclosed concept is directed to an assembly built for the purpose of transitioning a plurality of lined container closures 2 or "lids" from a horizontal orientation to a nested and stacked column configuration, commonly referred to as a "stick," as shown in FIG. 4. In more detail, lining compound is applied, for example and without limitation, into the curl of the container closures 2 (e.g., lids, shells or can ends) in a liner 100 (e.g., without limitation, the rotary liner partially shown in FIG. 1) in a generally well-known manner. Once completely lined, the container closures 2 are then ejected from the liner 100 and transported (e.g., conveyed) in a horizontal orientation by a conveyance assembly 200 to an unload stacking assembly 300, where they are unloaded into a unique discharge hopper 302 and stacked in the desired aforementioned orientation, in stick form as will be discussed in greater detail hereinbelow.

In the non-limiting example embodiment of FIG. 1, the conveyance assembly 200 includes a first conveyor belt 202 and a second conveyor belt 204 disposed between said liner machine 100 and said discharge hopper 302, although it will be appreciated that any known or suitable number and/or configuration of conveyor belts and/or alternative conveyance equipment (not shown) could be employed without departing from the scope of the disclosed concept. Among other things, the linear velocity of the container closures 2 is progressively slowed down by the series of conveyor belts (e.g., without limitation, 202, 204), as desired, and the container closures 2 are preferably inspected as they are conveyed or transported by the conveyor belts 202, 204 to the discharge hopper 302.

As will be discussed, among other benefits, the disclosed concept provides a means for increasing the speed at which the container closures 2 can be processed. Specifically, the disclosed concept enables processing speeds and throughput of more than 2100 ends per minute (EPM), and in accordance with one preferred non-limiting embodiment, speeds of up to 3500 EPM. Further, the disclosed concept improves upon previous technology utilized in the industry by reducing the forces applied to container closures 2 during the unloading and stacking process. The reduction of forces applied to the container closures 2 minimizes, or eliminates, the occurrence of physical damage to the container closures 2. The reduced forces applied to the container closures 2 also minimizes, or eliminates, the possibility of a lining compound being undesirably displaced (e.g., without limitation, spilling out of the curl of the shell or can end).

As shown in FIG. 2, in addition to the discharge hopper 302, the disclosed unload and stacking assembly 300 includes a deflector 304 structured to deflect container closures 2 into the hopper 302 in a desired orientation, best shown in the section view of FIG. 4, a pusher assembly 306, and a control system 310 (shown in simplified schematic form in FIG. 2) adapted to detect the container closures 2 and operate the pusher assembly 306 to control movement of the container closures 2, as desired. The control system 310 may, for example and without limitation, optionally include features such as a user interface 350 (generally shown in FIG. 1) and is operable to control any number of components and aspects of the liner system 10, including but not limited to components and aspects of the unload and stacking assembly 300 and pusher assembly 306 and subcomponents thereof.

Continuing to refer to FIG. 1, as well as FIGS. 2-4, prior to leaving the last conveyor belt (e.g., third conveyor belt 204), the container closures 2 preferably travel through a presence sensor 312, which is used, for example and without limitation, to detect the position of the container closures 2 upstream of the discharge hopper 302, as well as to detect jams or other problems or issues with respect to the container closures, and in response, facilitate control of the pusher assembly 306. The control system 10 (FIG. 2) preferably also includes a second presence sensor 314 for detecting the location of container closures 2 within and/or with respect to the discharge hopper 302 and, in response, facilitate control of the pusher assembly 306, for example and without limitation, to operate the pusher assembly 306 at the appropriate speed. The is important because, among other reasons, for example and without limitation, pulling container closures 2 away at the wrong speed can cause the mechanical clearance to change at the load point of the hopper 302. Either too much, or too little clearance is likely to result in a jam.

As best shown in FIGS. 3 and 4, the conveyance assembly 200 is generally disposed in a horizontal plane 208 and the discharge hopper 302 is preferably disposed at a discharge angle 308 with respect to the horizontal plane 208. In more detail, the discharge angle is preferably between 15-60 degrees and, more preferably is about 35 degrees. This unique angle 308 is a novel and important aspect of the disclosed concept, which in combination with other aspects of the disclosed concept helps to control the movement, positioning and stacking of container closures 2 in the "stick" orientation as previously discussed and as shown in the enlarged section view of FIG. 4.

As shown in FIG. 4, the unload stacking assembly 300 includes a deflector 304 structured to induce a rotation motion of the container closures 2 in the direction generally indicated by arrow 400, shown in FIG. 4 with respect to the roller 210 of conveyor belt 206 (partially shown in FIG. 4). This rotation motion, in addition to the aforementioned unique discharge angle 308 of the discharge hopper 302, further facilitates positioning of the container closures 2 within the discharge hopper 302 as generally indicated by arrows 402 and 404 in FIG. 4. It will be appreciated that the deflector 304 could have any known or suitable configuration or combination of components and features to induce the desired motion of the container closures 2. In the non-limiting example shown and described herein, a number of movable or adjustable elements 330, 340 (best shown in the enlarged section view of FIG. 4) are included each of which individually, or in any suitable combination, can be moved or adjusted as needed to impart the desired movement or motion on the container closures 2.

Additionally, the liner system 10 preferably further includes a vacuum (generally indicated by reference 320 in FIG. 4 (see also vacuum 320 and elements thereof shown in FIGS. 1-3). It will be appreciated that the vacuum 320 is plumbed to induce force on the container closures 2 to facilitate nesting of the container closures into and among the stack or "stick" of container closures within the system.

Accordingly, a method of stacking container closures 2 in accordance with a non-limiting embodiment of the disclosed concept includes the steps of: conveying a plurality of container closures 2 from a liner machine 100 to a discharge hopper 302 on a conveyance assembly 200; inducing a rotation motion of the container closures 2 using a deflector 304 to move the container closures 2 into the discharge hopper 302 in a desired orientation (best shown in FIG. 4); detecting the container closures 2 using a control system 310 including at least one presence sensor 312, 314; and responsive to detecting the container closures 2, operating a pusher assembly 306 to apply a vacuum and control movement of the container closures 2.

Among other advantages, the disclosed unload stacking assembly 300 and discharge hopper 302 therefor reduces forces on the container closures 2, thereby reducing or eliminating displacement of lining compound and mechanical damage to the container closures 2. The lower forces imparted on the container closures 2 enables higher operating speeds and throughput. Accordingly, operating speeds in accordance with the disclosed concept can be up to 3500 EPM, or more, while reducing forces applied to the container closures 2 by up to 50 percent, or more, compared to the known prior art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An unload stacking assembly comprising:

a discharge hopper structured to receive a plurality of container closures from a conveyance assembly; and a deflector structured to deflect said container closures into said discharge hopper in a desired orientation, wherein said conveyance assembly is disposed in a horizontal plane; and wherein said discharge hopper is disposed at a discharge angle with respect to said horizontal plane; and wherein said discharge angle is between 33-37 degrees, wherein said deflector is structured to induce a rotation motion of said container closures as said container closures enter the discharge hopper and said rotation motion continues through a portion of the discharge hopper, the deflector including two adjustable elements that induce the rotation motion of said container closures; and wherein said rotation motion is clockwise with respect to said horizontal plane such that leading edges of said container closures rotate in a downward direction with respect to said horizontal plane and trailing edges of said container closures rotate in an upward direction with respect to said horizontal plane.

2. The unload stacking assembly of claim 1 wherein said discharge angle is 35 degrees.

3. A liner system comprising:

a liner machine for lining a plurality of container closures;

a conveyance assembly for conveying said plurality of container closures from the liner machine; and an unload stacking assembly comprising:

a discharge hopper for receive a plurality of said container closures from said conveyance assembly, and a deflector for deflecting said container closures into said discharge hopper in a desired orientation, wherein said conveyance assembly is disposed in a horizontal plane; wherein said discharge hopper is disposed at a discharge angle with respect to said horizontal plane; and wherein said discharge angle is between 15-60 degrees, wherein said deflector is structured to induce a rotation motion of said container closures as said container closures enter the discharge hopper and said rotation motion continues through a portion of the discharge hopper, the deflector including two adjustable elements that induce the rotation motion of said container closures; and wherein said rotation motion is clockwise with respect to said horizontal plane such that leading edges of said container closures rotate in a downward direction with respect to said horizontal plane and trailing edges of said container closures rotate in an upward direction with respect to said horizontal plane.

4. The liner system of claim 3 wherein said conveyance assembly includes a first conveyor belt and a second conveyor belt disposed between said liner machine and said discharge hopper.

5. The liner system of claim 3 wherein said discharge angle is 35 degrees.

6. The liner system of claim 3 wherein said discharge angle is between 33-37 degrees.

7. A method of stacking container closures comprising the steps of:

conveying a plurality of container closures from a liner machine to a discharge hopper on a conveyance assembly, and inducing a rotation motion of said container closures using a deflector to move said container closures into said discharge hopper in a desired orientation, wherein said conveyance assembly includes a number of conveyor belts disposed in a horizontal plane; and wherein said discharge hopper is disposed at a discharge angle with respect to said horizontal plane, and wherein said discharge angle is between 15-60 degrees, wherein said deflector is structured to induce a rotation motion of said container closures as said container closures enter the discharge hopper and said rotation motion continues through a portion of the discharge hopper, the deflector including two adjustable elements that induce the rotation motion of said container closures; and wherein said rotation motion is clockwise with respect to said horizontal plane such that leading edges of said container closures rotate in a downward direction with respect to said horizontal plane and trailing edges of said container closures rotate in an upward direction with respect to said horizontal plane.

8. The method of claim 7 wherein said discharge angle is 35 degrees.

9. The method of claim 7 wherein said discharge angle is between 33-37 degrees.

* * * * *